(12) United States Patent
Schoen et al.

(10) Patent No.: US 7,911,090 B2
(45) Date of Patent: Mar. 22, 2011

(54) STATOR OF AN ELECTRICAL MACHINE, ELECTRICAL MACHINE, AND POWER TOOL

(75) Inventors: Ludwig Schoen, Ludwigsburg (DE); Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 12/194,587

(22) Filed: Aug. 20, 2008

(65) Prior Publication Data
US 2010/0045123 A1 Feb. 25, 2010

(51) Int. Cl.
*H02K 7/14* (2006.01)

(52) U.S. Cl. ....... 310/50; 310/52; 310/81; 310/216.022; 310/216.096; 310/216.097; 310/112; 310/269; 310/216.001; 310/216.007; 310/216.008

(58) Field of Classification Search .................... 310/50, 310/52, 81, 154, 156, 216.007, 216.008, 310/216.022, 216.096, 216.097, 216.112, 310/269; *H02K 7/14*
See application file for complete search history.

(56) References Cited

U.S. PATENT DOCUMENTS

| | | | | |
|---|---|---|---|---|
| 1,504,551 A | * | 8/1924 | Haas | 310/51 |
| 3,604,961 A | * | 9/1971 | Saldinger | 310/51 |
| 3,643,118 A | | 2/1972 | Ichiki et al. | |
| 3,749,959 A | | 7/1973 | Reiss | |
| 3,978,356 A | * | 8/1976 | Spiesberger | 310/156.42 |
| 4,467,233 A | * | 8/1984 | Moren et al. | 310/162 |
| 5,327,035 A | * | 7/1994 | Sunaga | 310/81 |
| 5,955,814 A | | 9/1999 | Fujiwara | |
| 6,728,063 B1 | * | 4/2004 | Gustafson et al. | 360/99.08 |
| 6,952,065 B2 | | 10/2005 | Park et al. | |
| 6,963,469 B1 | * | 11/2005 | Gustafson et al. | 360/99.08 |
| 7,714,474 B2 | * | 5/2010 | Yoshikawa et al. | 310/216.001 |
| 2002/0195891 A1 | * | 12/2002 | Miyasaka | 310/81 |
| 2003/0107273 A1 | * | 6/2003 | Ikeda et al. | 310/43 |
| 2004/0169432 A1 | | 9/2004 | Park et al. | |
| 2004/0203330 A1 | * | 10/2004 | Kleider | 451/359 |
| 2005/0285462 A1 | * | 12/2005 | Akiyama | 310/68 B |
| 2006/0113098 A1 | * | 6/2006 | Inagawa et al. | 173/162.2 |
| 2007/0132322 A1 | | 6/2007 | Chiang | |
| 2010/0045123 A1 | * | 2/2010 | Schoen et al. | 310/50 |

FOREIGN PATENT DOCUMENTS

| | | |
|---|---|---|
| DE | 2 021 357 | 11/1970 |
| DE | 88 591 | 3/1972 |
| DE | 38 42 807 | 9/1989 |
| DE | 295 21 313 | 12/1996 |
| DE | 197 00 074 | 9/1997 |
| DE | 298 00 928 | 3/1998 |
| DE | 696 05 595 | 6/2000 |
| DE | 603 12 471 | 6/2007 |
| EP | 1 499 000 | 1/2005 |
| GB | 238660 | 8/1925 |
| GB | 2 026 780 | 2/1980 |
| GB | 2 222 729 | 3/1990 |
| GB | 2 245 108 | 12/1991 |
| JP | 10023690 | 1/1998 |
| JP | 2003125568 | 4/2003 |
| WO | WO 2007061135 A2 * | 5/2007 |

* cited by examiner

*Primary Examiner* — Quyen Leung
*Assistant Examiner* — John K Kim
(74) *Attorney, Agent, or Firm* — Michael J. Striker

(57) ABSTRACT

A stator of an electrical machine has a cross section, a longitudinal extension, a jacket surface, a plurality of winding holders configured for receiving field windings, the winding holders being distributed inhomogenously around an inner circumference of the cross section, such that a density of the field windings in at least one first region formed around a stator circumference is smaller than in an adjacent second region.

11 Claims, 4 Drawing Sheets

STATOR OF AN ELECTRICAL MACHINE, ELECTRICAL MACHINE, AND POWER TOOL

BACKGROUND OF THE INVENTION

The present invention is directed to a stator of an electrical machine, an electrical machine, and a power tool with an electrical machine.

Electrical machines that are composed of a stator and a rotor, and that may be operated using alternating current or direct current, are also referred to as universal motors. Electric motors of this type are often used in household appliances and power tools; they may be powered by an alternating-current system, and a rectifier may also be used.

Increasingly greater energy densities are being required specifically of power tools, e.g., of angle grinders, since customers continually demand ever-smaller tools. The reduction in tool size should not necessarily require that the power also be reduced. Instead, reduced tool size should make it possible to increase the power. Basic limiting geometric conditions often makes this impossible, however.

With small angle grinders, for example, the electric motor is located directly in the user's grip region. The diameter of the electric motor is therefore particularly significant in this region, since it directly affects the diameter of the grip. Angle grinders typically have a further property that influences the grip shape and diameter, however. The tool is set into operation by actuating a pushbutton, and the switch-on motion takes place via a sliding switch that passes by the electric motor, in the rear region of the tool, in order to actuate an electrical switch that is located there inside the tool housing. To this end, the field core of the electric motor has a flat region in the axial direction on both sides of the field core. The housing in the grip region therefore encloses the electric motor, a sliding switch, and possibly an air gap between the electric motor and the housing, to ensure adequate cooling.

If the sliding switch is moved too closely to the field core, i.e., the laminated iron core, there is a risk that the field windings of the sliding switch could become jammed due to accumulation of dirt or deformation due to high temperature, thereby impairing or blocking the switch-on function—and, primarily, the switch-off function—of the device.

For this reason, two-pieced fields, i.e., a longitudinally divided field core with two core halves, have been provided, in the case of which the field core is separated in the pole separation. The coil windings may be inserted in the core halves very easily and accurately, as a premanufactured coil or by winding the coil directly in place. The core halves are placed on top of each other before installation, and they are installed together with the motor housing. The two-pieced core is typically flat on the sides and makes it possible to obtain a much greater distance between the sliding switch and the field core than is possible with a one-pieced design. In the one-pieced design, the field core is composed of only one laminated core. The width of the field winding is greater than it is with a one-pieced field, however, with the disadvantage of higher losses in the field winding as compared with the one-pieced design.

SUMMARY OF THE INVENTION

The present invention is directed to a stator of an electrical machine, in particular of a universal motor, with a cross section, a longitudinal extension, and a jacket surface.

It is provided that winding holders for receiving field windings are distributed inhomogeneously around the inner circumference of the cross section such that at least a first region is formed around the stator circumference that has a smaller density of field windings than in an adjacent second region.

The stator may be designed with a one-pieced configuration with a field core, or it may have a two-pieced or multiple-pieced design, with which the field core is therefore composed of two or more laminated cores. The field core may also be composed of solid material or sintered material instead of laminated iron.

Advantageously, due to the asymmetrical location of the winding holders for the field windings in a region of the stator, a favorable geometry results for a one-pieced design of a field core, which results in a relative short winding length due to a relatively small winding width of the field winding, which, in turn, results in low ohmic resistance and, therefore, low electrical losses in the winding. This results in favorable efficiency with a correspondingly favorable, high energy density for an electrical machine, especially since it is not necessary to provide open space for installation in a motor housing.

Instead, the stator may optimally fill a motor housing in this region and make optimal use of its installation space. As such, a relatively great deal of iron is available on this side for the electromagnetic operation of the electrical machine and/or the electric motor. Due to the asymmetrical placement of the winding holders in the other region, however, it is possible to create open space when they are installed in a housing, which open space may be used for any type of component. The inner diameter of the stator in which a rotor may be accommodated remains unchanged. A large, flat region of the jacket surface of the field core in this region results in an advantageous synergy based on the installation space in a housing. The pole horns of the winding holders may be designed with equal lengths, or they may have different lengths. Advantageously, improved power output—of a universal motor, in particular—results from a cylindrical motor housing in combination with a sliding switch.

The jacket surface may advantageously have a flat section in the first region. In the fully-assembled power tool, a sliding switch or another type of component, for instance, may be located in the region of the flat section.

The two pole horns of each winding holder may have different lengths. Advantageously, the pole horn may be shortened on a side facing away from the flat section, thereby reducing the interconnection angle and improving the commutation of the electric motor for the corresponding applications and operating states of the electrical machine. In addition, the distance between the pole horns in the pole gap may be kept so great that it is ensured that the field windings may be installed in a manner that is favorable for production purposes. When field windings are inserted in a one-pieced field core in particular, one winding side or one winding leg may be inserted in a slot that belongs to the long pole horn, then the other winding side and/or the other winding leg may be inserted in the slot of the short pole horn. The fullness factor of the field windings may be increased as a result.

It is therefore advantageously possible to design the pole horns of directly adjacent winding holders—that are located close together and face each other—to be shorter than pole horns located further apart.

By locating the lamination sections accordingly in a special, multi-tracked punching tool, it is possible to reduce the waste and costs compared with a "round", single-pieced design.

To this end, an axial division of the stator into two stator halves may be favorably provided, with the two halves designed with mirror symmetry. This makes it easier to insert prefabricated field windings in particular, and the fullness factor of the field winding is improved.

As an alternative, an axial division into three stator sections may be provided, with each stator section designed without a winding holder. This stator section has a particularly simple geometry.

The individual stator sections may be interconnected before they are installed in a motor housing.

According to a further aspect of the present invention, an electrical machine, in particular of universal motor, with a stator that has a cross section, a longitudinal extension, and a jacket surface, and a rotor, which interacts with the stator are provided, with which the stator includes winding holders for receiving field windings, which are distributed inhomogeneously around the inner circumference of the cross section such that the density of field windings in the at least one first region formed around the stator circumference is smaller than it is in an adjacent second region.

Favorably, an interconnection angle between pole axes of directly adjacent field windings may be smaller than 180°. As a result, the stator may be flattened in a desired region, approximately one side of the sliding switch, thereby creating sufficient installation space for components, such as the aforementioned sliding switch or other device components. Given that the stator is round in the region of the pole horns, it is possible, as with the "round" design, to minimize the width of the windings and, therefore, their resistance, thereby increasing operational efficiency. The electrical machine offers a high energy density while providing a relatively great deal of installation space between the stator and the housing.

According to a further aspect of the present invention, a power tool, in particular an angle grinder, with an electric motor located inside a housing, with a stator that has a cross section, a longitudinal extension, and a jacket surface, and a rotor are provided, with which the stator includes winding holders for receiving field windings, which are distributed inhomogeneously around the inner circumference of the cross section such that the density of field windings in the at least one first region formed around the stator circumference is smaller than it is in an adjacent second region.

Its stator may be fitted into a motor housing such that open space is provided between a flat section in the jacket surface that is parallel to the longitudinal extension and is located in the region with the smaller density of winding holders, the open space serving to accommodate components, preferably a sliding switch, capacitors, coils, electronics printed circuit boards, resistors, and/or lines, such as electrical supply lines, signal lines, fluid lines, e.g., for coolant, lubricant, or the like. The components may also be guided inside the stator, in the region of the flat section, since a relatively large open space is also created in this region.

Further advantages result from the description of the drawing, below. Exemplary embodiments of the present invention are shown in the drawing. One skilled in the art will also advantageously consider the features disclosed in the drawing, the description and the claims individually and combine them to form further reasonable combinations.

DESCRIPTION OF THE PREFERRED EMBODIMENTS

Figure 1:
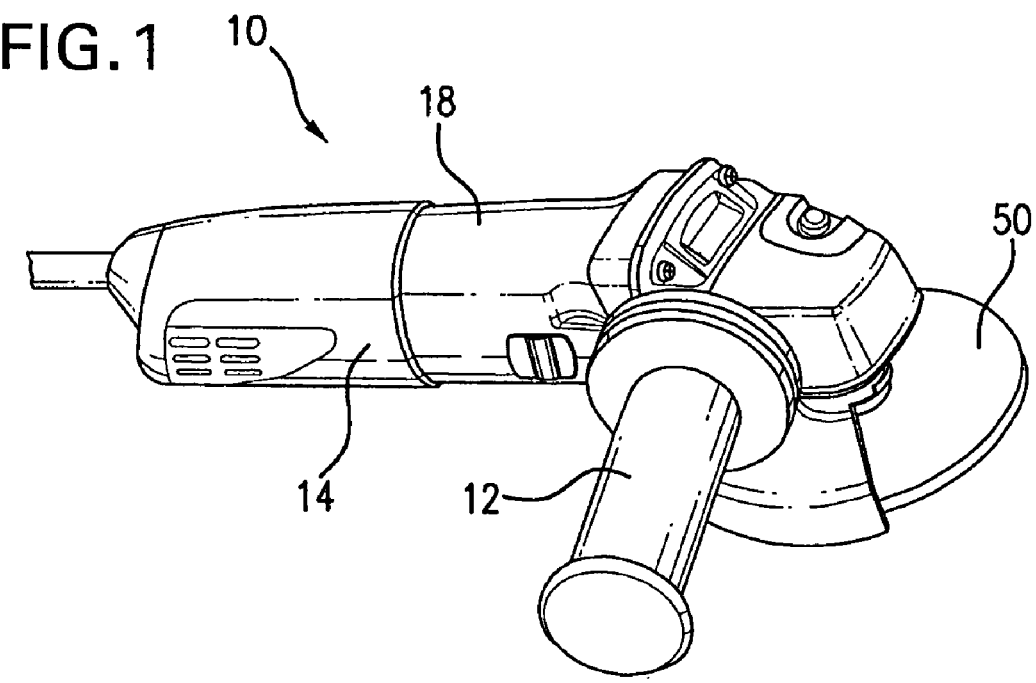
FIG. 1 shows a preferred power tool in the form of an angle grinder.

Elements that are the same or similar are labelled with the same reference numerals in the figures.

To explain the present invention, FIG. 1 shows a preferred power tool 10 designed as an angle grinder. Power tool 10, which is designed as an angle grinder, includes a grip part 14, in the front section of which—that points toward an insertion tool 16—a motor housing 18 is located. A handle 12 extends outwardly, transversely to grip part 14. During handling, a user holds handle 12 with one hand, holds grip part 14 with the other hand, and guides power tool 10—which is designed as an angle grinder—with insertion tool 16 over a work piece to be machined. The diameter of grip part 14 is limited to a magnitude such that the user may hold grip part 14 with one hand and securely guide it.

Figure 2:
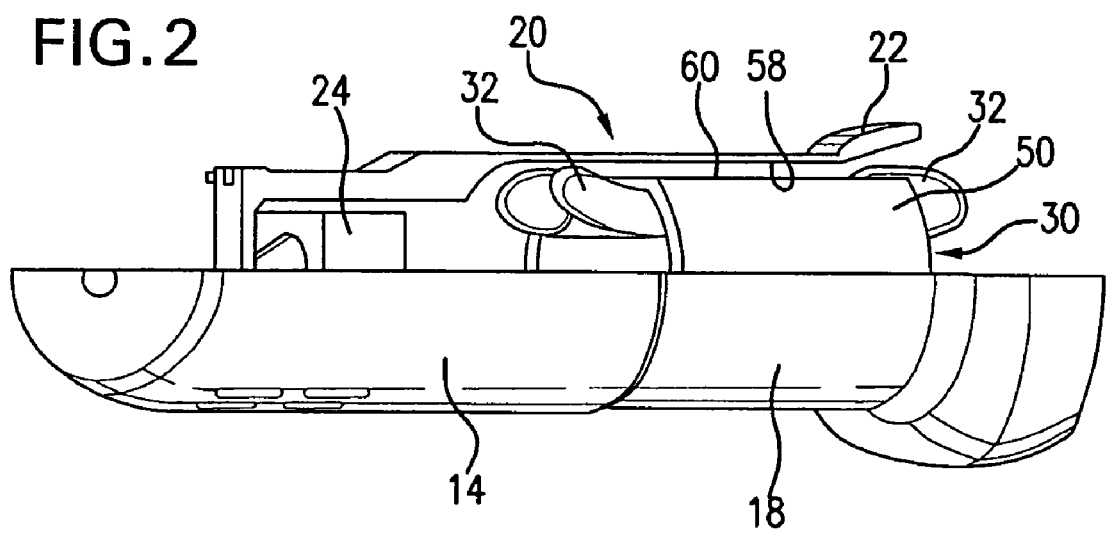
FIG. 2 shows a cross section of the grip part of the angle grinder in FIG. 1.

FIG. 2 shows a cross section of grip part 14 of the angle grinder in FIG. 1. An electric motor 30 designed as a universal motor is inserted in motor housing 18, the longitudinal axis of which lies in the longitudinal direction of grip part 14. An upper and a lower winding head of a field coil 32 are shown, which extend axially out of a stator 50 of electric motor 30. A flat section 60 on a jacket surface 58 of stator 50 is shown.

A sliding switch 20, for example, is located above flat section 60, which is actuated via a pushbutton 22 that is accessible to the user from the outside, and which is slid backward toward a switch 24 inside grip part 14.

The diameter of stator 50 and the distance between sliding switch 20 and stator 50 essentially determine the diameter of grip part 14.

Figure 3A:
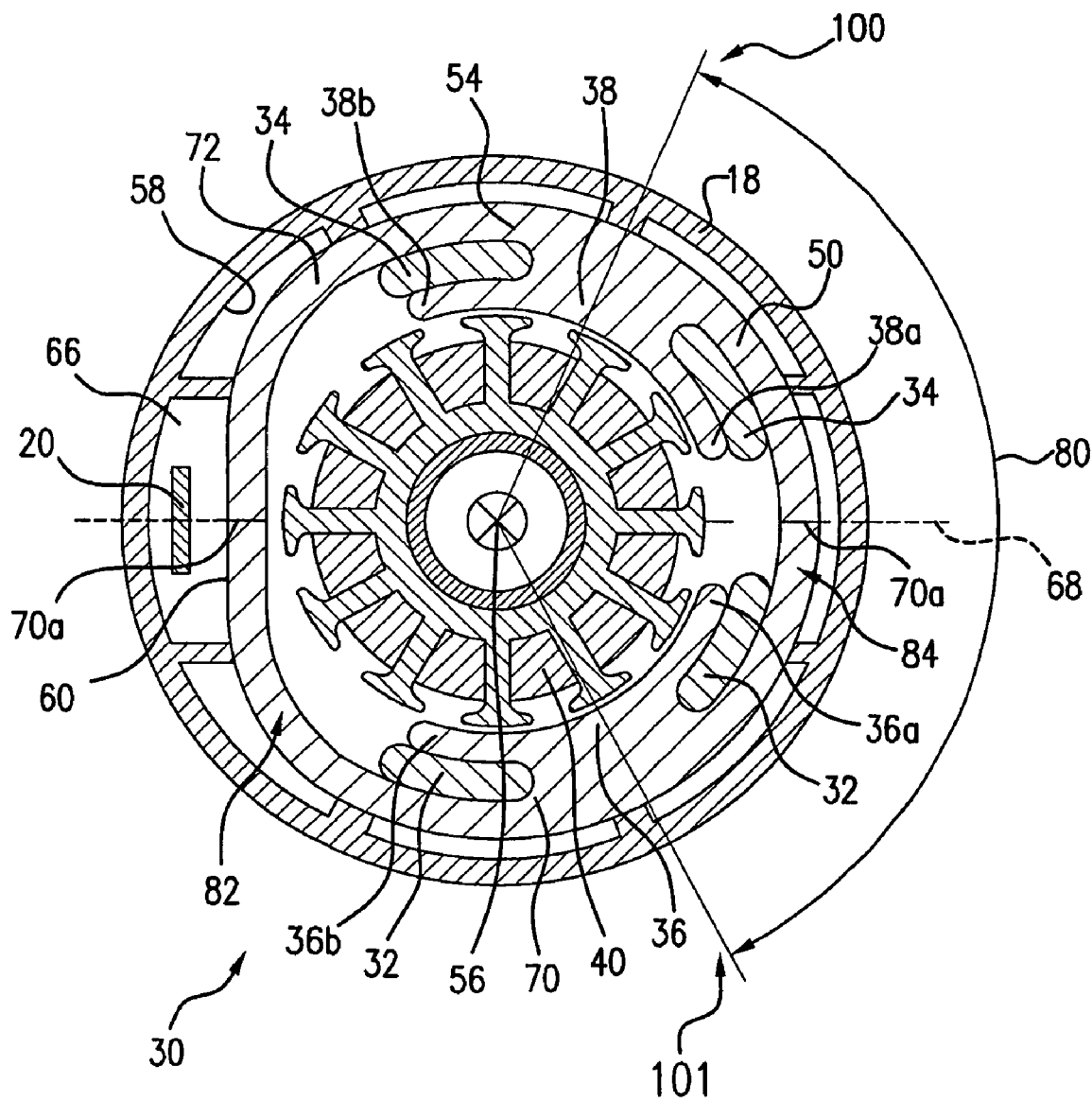
FIG. 3a shows a top view of a cross section of the grip part in FIGS. 1 and 2.
Figure 3B:
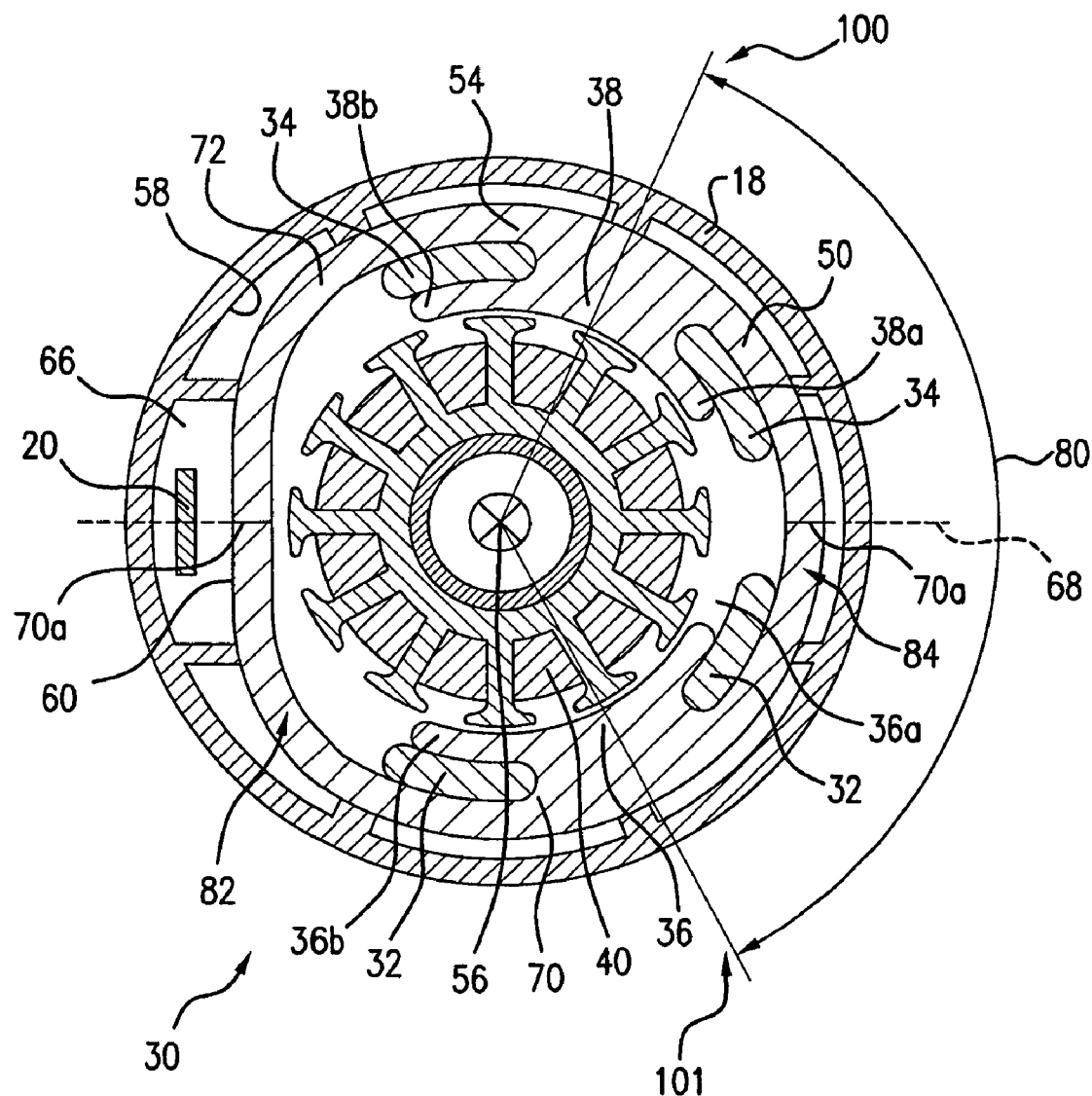
FIG. 3b shows the cross section in FIG. 3a with a first division of the stator into two mirror-symmetrical stator sections.
Figure 3C:
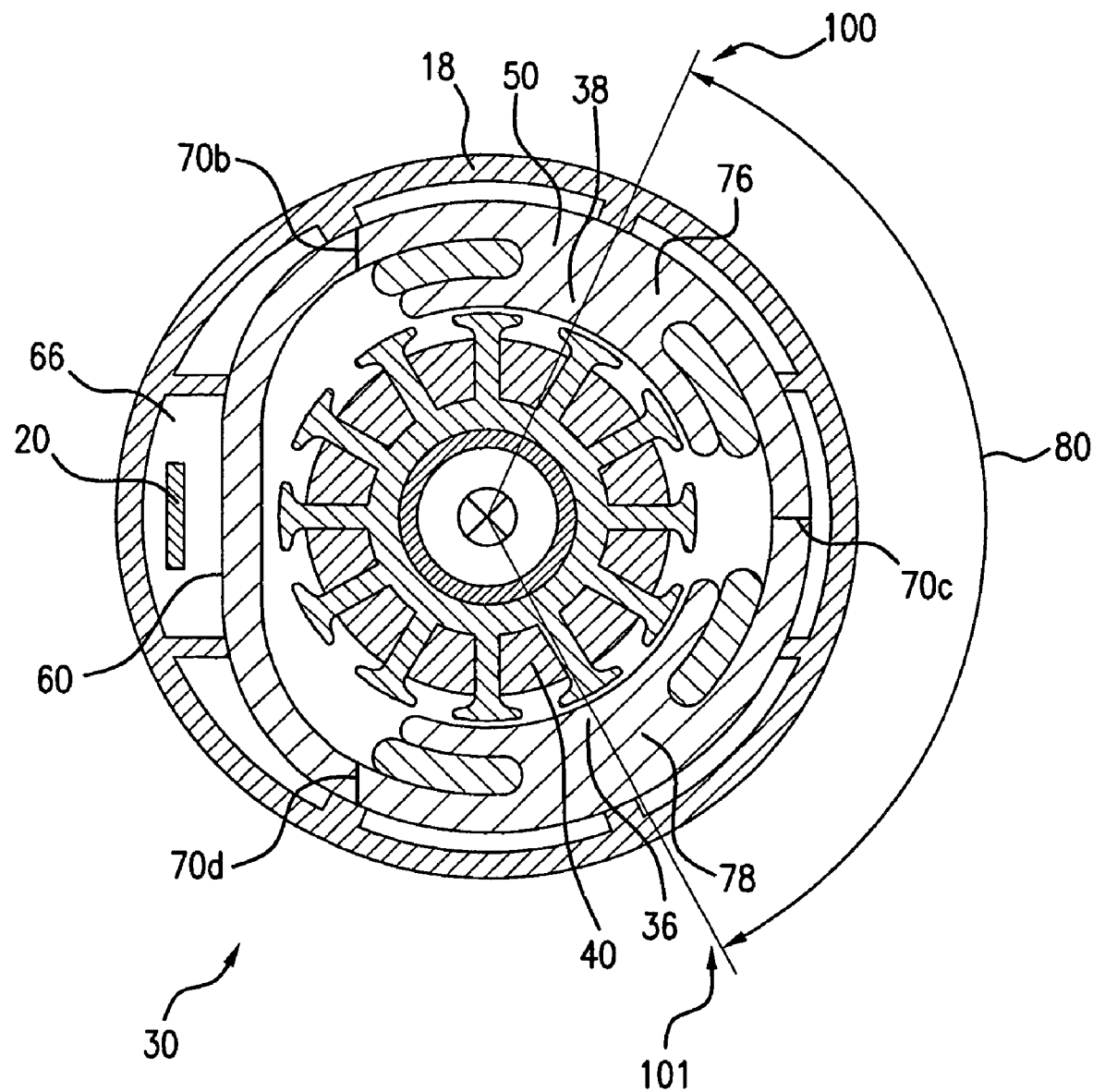
FIG. 3c shows the cross section in FIG. 3a with a second division, into three stator sections.

The details of preferred stator 50 and preferred electric motor 30, which is designed as a universal motor, are shown in a top view in FIGS. 3a, 3b, and 3c, and in a cross section 54 of grip part 14 in FIGS. 1 and 2. Stator 50 includes, e.g., two pole shoes, which serve as winding holders 36, 38.

As shown, winding holders 36, 38 for receiving field windings 32, 34 are distributed inhomogeneously around the inner circumference of cross section 54 such that at least a first region 82 is formed around the stator circumference that has a smaller density of field windings 32, 34 than in an adjacent second region 84, in which all winding holders 36, 38 are located. First region 82 is free of winding holders. In a first region 82, jacket surface 58 includes a flat section 60, which, when installed in a motor housing 18, provides open space 66 between flat section 60, which serves to accommodate sliding switch 20. Open space 66a, 66b is also created inside stator 50, between stator 50 and rotor 40, which may be used, e.g., to accommodate lines. The inhomogeneous distribution of winding holders 36, 38 results in a markedly unround cross section 54 of stator 50.

Interconnection angle 80, which is measured from the pole center between the two pole axes 100, 101 of the particular paired pole horns 36a, 36b and 38a, 38b, is less than 180°.

FIGS. 3a and 3c show both pole horns 36a, 36b and 38a, 38b of each winding holder 36, 38 with the same length, while FIG. 3b shows closely adjacent pole horns 36a, 38b that are shorter than pole horns 36b, 38b.

FIGS. 3a and 3b show an axial division of stator 50 parallel to a longitudinal extension 56 of stator 50 with separation points 70a along a line 68 into two stator halves 70, 72, with halves 70, 72 being designed with mirror symmetry. Separation points 70a are located in the center of flat section 60 and correspond to the center between the two winding holders 36, 38.

FIG. 3c shows an axial division of stator 50 into three circumferentially divided separation points 70b, 70c, 70d. Stator 50 is therefore divided into three stator sections 74, 76, 78. Separation points 70b, 70d are located such that one stator section 74 is designed without a winding holder. It coincides with first region 82 (FIG. 3a), which includes flat section 60 but does not include a winding holder. The three separation points 70c are located in the center, between winding holders 36, 38. Stator sections 76 and 78 are therefore designed with mirror symmetry relative to each other.

The preferred embodiment of stator 50 and/or electric motor 30 in combination with a cylindrical or nearly cylindrical housing 18, and in combination with a sliding switch 20 or one or more other device components results in optimal use of the installation space of housing 18 and an advantageously small diameter of grip part 14 with a high power output, in particular with a universal motor that is installed in a handheld power tool 10.

It will be understood that each of the elements described above, or two or more together, may also find a useful application in other types of constructions differing from the types described above.

While the invention has been illustrated and described as embodied in a stator of an electrical machine, electrical machine, and power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A stator of an electrical machine, comprising:
a cross section;
a longitudinal extension;
a jacket surface; and
a plurality of winding holders configured for receiving field windings, said winding holders being distributed inhomogenously around an inner circumference of said cross section, such that a density of the field windings in at least one first region formed around a stator circumference is smaller than in an adjacent second region, wherein each of said winding holders has two pole horns with different lengths.

2. A stator of an electrical machine as defined in claim 1, wherein said jacket surface in said first region has a flat section that does not include a winding holder.

3. A stator of an electrical machine, comprising:
a cross section;
a longitudinal extension;
a jacket surface; and
a plurality of winding holders configured for receiving field windings, said winding holders being distributed inhomogenously around an inner circumference of said cross section, such that a density of the field windings in at least one first region formed around a stator circumference is smaller than in an adjacent second region, wherein each of said winding holders has two pole horns, said winding holders including winding holders that are directly adjacent, face each other and are separated by a small distance, and have the pole horns which are configured to be shorter than the pole horns located further apart from each other.

4. A stator of an electrical machine as defined in claim 1, wherein the stator has two half stator sections configured so that an axial division is arranged so that said half sections are configured with mirror symmetry.

5. A stator of an electrical machine, comprising:
a cross section;
a longitudinal extension;
a jacket surface; and
a plurality of winding holders configured for receiving field windings, said winding holders being distributed inhomogenously around an inner circumference of said cross section, such that a density of the field windings in at least one first region formed around a stator circumference is smaller than in an adjacent second region, wherein the stator has three stator sections with an axial division configured so that one of said stator sections is configured without a winding holder.

6. An electrical machine, comprising:
a stator, said stator including a cross section; a longitudinal extension; a jacket surface; and a plurality of winding holders configured for receiving field windings, said winding holders being distributed inhomogenously around an inner circumference of said cross section, such that a density of the field windings in at least one first region formed around a stator circumference is smaller than in an adjacent second region, wherein the electrical machine is configured as a universal motor.

7. An electrical machine as defined in claim 6, wherein said field windings have directly adjacent field windings with an interconnection angle between pole axes of said directly adjacent field windings being less than 180 degrees.

8. A power tool, comprising:
a housing;
an electric motor located inside said housing and having a stator, said stator including a cross section; a longitudinal extension; a jacket surface; and a plurality of winding holders configured for receiving field windings, said winding holders being distributed inhomogenously around an inner circumference of said cross section, such that a density of the field windings in at least one first region formed around a stator circumference is smaller than in an adjacent second region, wherein said stator is fitted into said housing such that an open space is provided between a flat section in a jacket surface that is parallel to a longitudinal extension and is located in a region with a smaller density of said winding holders, said open space being configured for accommodating components.

9. A power tool as defined in claim 8, wherein said open space is configured for accommodating the components selected from the group consisting of a sliding switch, at least one electric line, electronic components, electrical components, signal lines, fluid lines, and combinations thereof.

10. A power tool as defined in claim 8, wherein the power tool is configured as an angle grinder.

11. A stator of an electrical machine as defined in claim 3, wherein the stator has two half stator sections configured so that an axial division is arranged so that said half sections are configured with mirror symmetry.

* * * * *